United States Patent [19]

Graber et al.

[11] Patent Number: 4,733,810
[45] Date of Patent: Mar. 29, 1988

[54] FOLDABLE BICYCLE SUPPORT DEVICE

[75] Inventors: Joseph V. Graber, Middleton; Jeffrey G. Romenesko, Madison, both of Wis.

[73] Assignee: Graber Products, Inc., Madison, Wis.

[21] Appl. No.: 41,546

[22] Filed: Apr. 23, 1987

[51] Int. Cl.⁴ .............................................. B60P 3/06
[52] U.S. Cl. .................................. 224/329; 224/314; 224/321; 224/322; 224/325; 211/17; 16/374; 414/462
[58] Field of Search ............... 224/329, 309, 314, 315, 224/317, 320, 321, 322, 323, 324, 325, 326, 331, 42.03 B; 211/17, 18, 19, 20, 21, 22; 414/462; 280/289 R; 16/374, 377

[56] References Cited

U.S. PATENT DOCUMENTS

| 2,347,980 | 5/1944 | Apfelbaum | 16/374 X |
| 3,901,421 | 8/1975 | Kallicki et al. | 224/42.03 B |
| 3,994,425 | 11/1976 | Graber | 224/42.03 B |
| 4,039,106 | 8/1977 | Graber | 224/329 |
| 4,129,922 | 12/1978 | Law et al. | 16/374 X |
| 4,345,705 | 8/1982 | Graber | 224/42.03 B |
| 4,386,709 | 6/1983 | Graber | 211/20 |
| 4,442,961 | 4/1984 | Bott | 224/42.03 B |
| 4,452,384 | 6/1984 | Graber | 224/314 |

FOREIGN PATENT DOCUMENTS

| 8501023 | 3/1985 | European Pat. Off. | 224/309 |
| 2383806 | 11/1978 | France | 224/309 |
| 7907063 | 3/1981 | Netherlands | 224/329 |
| 8202017 | 12/1982 | Netherlands | 224/309 |

Primary Examiner—Henry J. Recla
Assistant Examiner—Ernest G. Cusick
Attorney, Agent, or Firm—Vernon J. Pillote

[57] ABSTRACT

A foldable bicycle support device including first and second cross frame members and first and second bicycle wheel receiving channels extending crosswise of the cross frame members. First and second bicycle support members are pivotally mounted by hinge brackets to the same cross frame member for swinging movement about an axis paralleling the cross frame member, and the first and second bicycle support brackets each have a portion that converges toward a medial plane between the wheel support brackets and laterally extending upper portions that extend transverse to the plane for engaging and supporting a bicycle frame. The converging portions of the bicycle support brackets are rigidly interconnected so that the first and second support brackets form a laterally stable assembly that is movable as a unit between a lower and a raised position.

6 Claims, 6 Drawing Figures

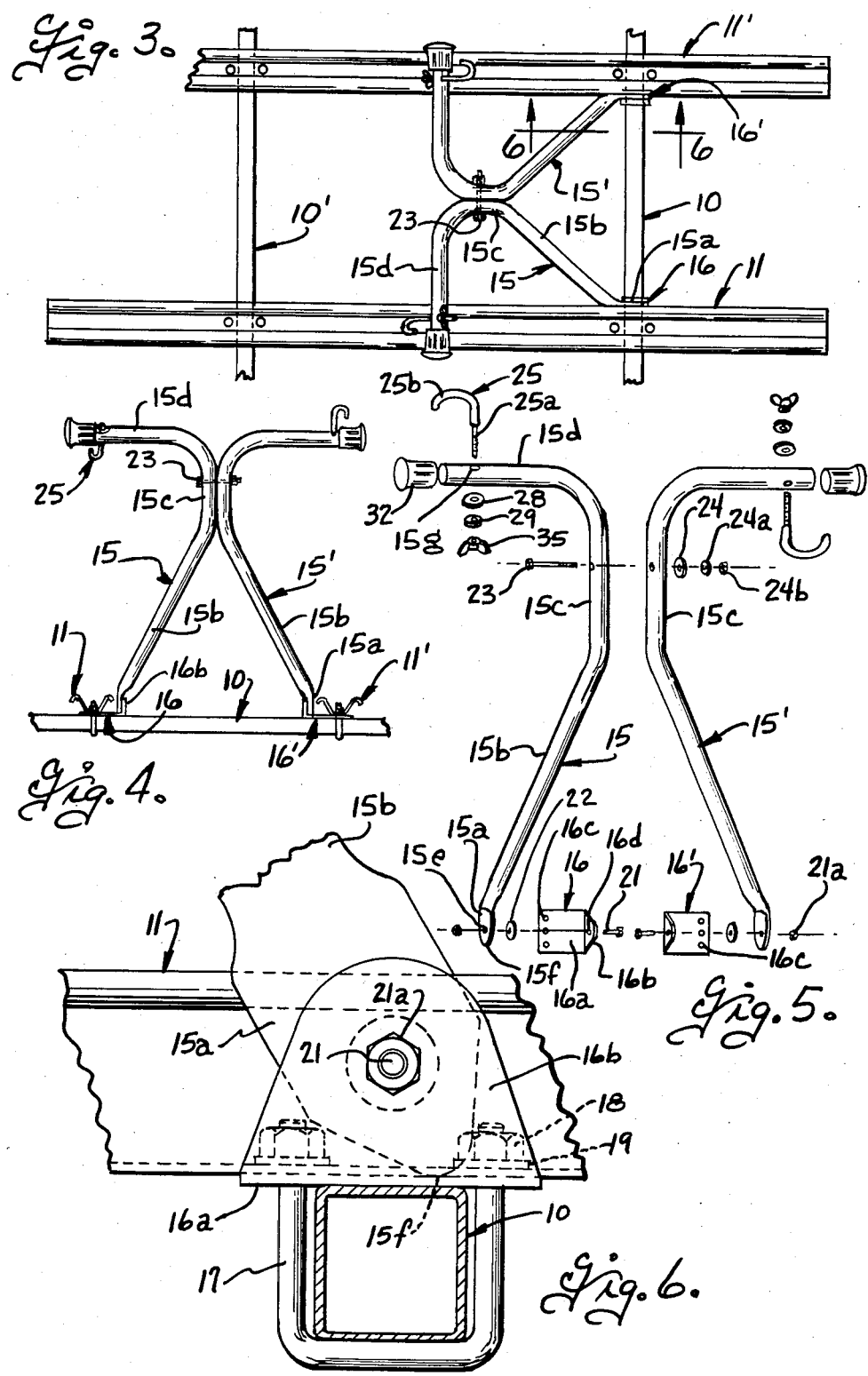

FOLDABLE BICYCLE SUPPORT DEVICE

BACKGROUND OF THE INVENTION

U.S. Pat. Nos. 3,901,421; 3,994,425; 4,345,705, and 4,452,384 disclose bicycle carriers adapted for mounting on the roof or deck lid of an automobile which utilize a pair of upwardly opening channels mounted in relatively parallel relation on a pair of cross frame members for receiving the wheel of the bicycles, and an upwardly extending bicycle support frame mounted on the pair of cross frame members intermediate the channels for engaging and supporting a pair of bicycles resting in the two wheel receiving channels. In U.S. Pat. No. 4,345,705, the bicycle support frame comprises two bicycle support members each of which is pivotally mounted on a respective one of the cross frame members, and which bicycle support members are arranged to cross each other and are detachably connected intermediate their ends to form an X-shaped support for two bicycles. In U.S. Pat. No. 4,452,384, an individual bicycle support member was provided for each wheel receiving channel and supported for swinging movement between the lower and raised position. However, when bicycle support devices are used to carry bicycles on vehicles, they are subjected to relatively high forces in a direction crosswise of the vehicle during turning and in high winds, and some problems were presented in achieving adequate lateral stability in the device disclosed in U.S. Pat. No. 4,452,3S4.

SUMMARY OF THE INVENTION

It is an object of the present invention to provide a foldable bicycle support device which can be folded for compact storage and to reduce overhead clearance when mounted on a vehicle, and which provides a laterally stable support for the bicycles when in use.

Another object of this invention is to provide a bicycle support device of simple construction and which can be economically manufactured and assembled.

Accordingly, the present invention provides a foldable bicycle support device of the type having first and second cross frame members and first and second wheel receiving channels extending crosswise of the first and second cross frame members in laterally spaced relation. First and second bicycle support members are pivotally attached at their lower ends to hinge brackets on the first cross member, and the bicycle support members each have a converging portion that extends upwardly from its lower end portion in converging relation toward and upright medial plane intermediate the first and second wheel receiving channels; an intermediate portion disposed adjacent the upright medial plane, and an upper end portion that extends from the intermediate portion laterally outwardly from the upright medial plane. The intermediate portions of the first and second bicycle support members are rigidly interconnected to form a laterally rigid unit that can be moved between lower and raised positions. The first and second bicycle support members each have a means on the lower end engageable with the respective first and second hinge bracket to limit raising of the bicycle support members when they are disposed at a preselected angle to the wheel receiving channels, and bicycle frame clamp means are provided on the upper end portions of each of the bicycle support members for engaging a bicycle frame to support a bicycle in a generally upright plane in the respective first and second wheel receiving channels.

The first and second bicycle support members are advantageously of like configuration and the hinge brackets for pivotally mounting the bicycle support brackets on the cross frame members are also advantageously of like configuration. The means for limiting raising of the bicycle support members is preferably in the form of a cam nose on the lower ends of each of the bicycle support members arranged to engage the base portion of the associated hinge bracket.

BRIEF DESCRIPTION OF THE DRAWINGS:

FIG. 3 is a plan view of the bicycle support device;

FIG. 4 is an end elevational view of the bicycle support device;

FIG. 5 is an exploded view illustrating parts of the bicycle support device; and FIG. 6 is a fragmentary horizontal sectional view taken on the plane 6—6 of FIG. 3, and illustrating parts on a larger scale.

The foldable bicycle support device is particularly adapted for use as a vehicle attached carrier and, in general, includes first and second cross frame members 10, 10' and first and second bicycle wheel receiving channels 11 and 11' that extend crosswise of the cross frame members in laterally spaced relation. The foldable bicycle support device is especially adapted for use as a vehicle attached bicycle carrier and any suitable means may be provided for attaching the cross frame members to a vehicle. As shown in FIG. 1, the cross frame members are provided with vehicle engaging feet 12 adapted to rest on the roof or deck lid of a vehicle, and straps 13 for anchoring the cross members to the edge of the roof or deck lid of a vehicle. First and second bicycle support members 15, 15' are pivotally mounted at their lower ends by hinge brackets 16, 16' on the same cross member 10 for movement between a folded position adjacent the plane of the wheel receiving channels, and a raised position as shown in FIGS. 1–4.

Figure 1:
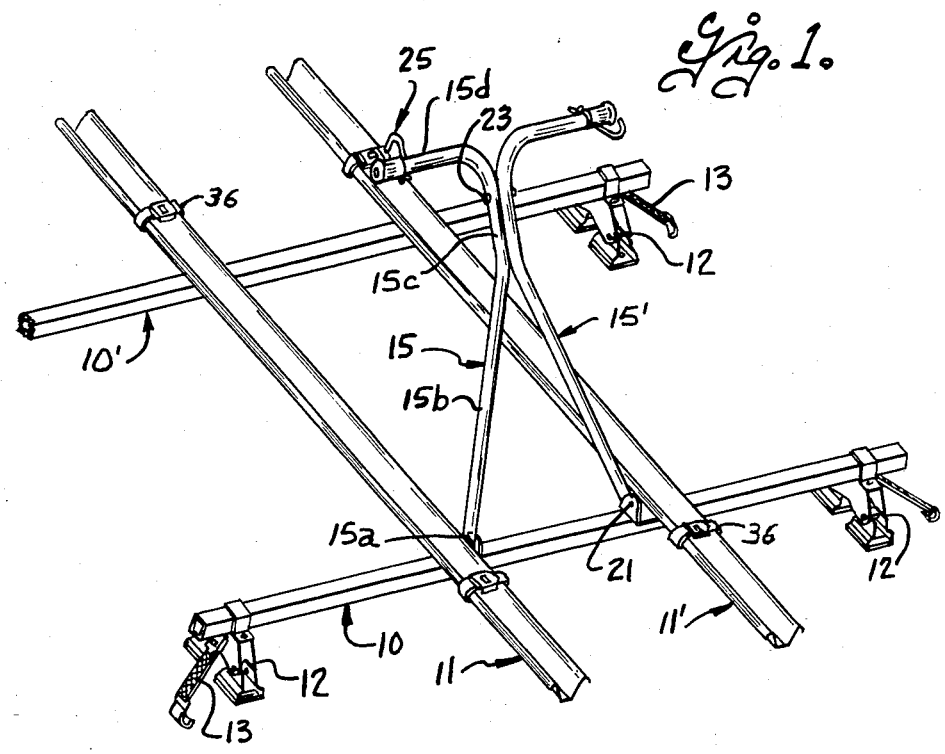
FIG. 1 is a perspective view of the bicycle support device.

The hinge brackets 16,16' are advantageously of like configuration and like numerals are used to designate corresponding parts. Each of the hinge brackets have a base portion 16a and a leg portion 16b that extends transverse to one end of the base portion. The hinge brackets 16, 16' are mounted with their base portions 16a overlying the cross frame member 10 and underlying a respective one of the channels 11, 11', with the leg portion 16b extending upwardly from the cross frame member adjacent the inner side of the respective one of the wheel receiving channels. The base portions 16a have a width greater than the horizontal width of the cross frame member 10 and, as best shown in FIG. 6, the hinge brackets and channels are attached to the cross frame member as by U-bolts 17. The U-bolts extend around the underside of the cross frame member 10 and through openings 16c (FIG. 5) in the base portion and through openings (not shown) in the base of the associated wheel receiving channel, 11, 11' and the parts are clamped in assembled relation by nuts 18 and lock washers 19.

The bicycle support members 15, 15' are formed of tubular stock and are advantageously of like configuration, and like numerals are used to designate corresponding parts. The bicycle support members each have a flattened lower end portion 15a disposed alongside the upwardly extending leg portion 16b of the respective one of the brackets 16, 16', and the bicycle support members each have a converging portion 15b that extends from the respective lower end portion 15a in converging relation toward an upright medial plane intermediate the first and second wheel receiving channels. The support members also include an intermediate portion 15c disposed adjacent the upright medial plane and an upper end portion 15d that extends from the intermediate portion laterally outwardly from the upright medial plane.

As best shown in FIG. 5, the flattened lower end portions 15a of the bicycle support members 15 and 15' are pivotally attached by a pivot bolt 21 that extend through an opening 16d in the leg portion and through an opening 15e in the flattened lower end 15a. A washer 22 of a synthetic resin material such as Nylon is interposed between the flattened lower end portion 15e of each bicycle support member and the leg 16b of the associated hinge bracket and a nut 21a is provided on the end of the pivot bolt 21 and tightened sufficient to compress the washer 22 so that the washer will tend to hold the bicycle support members in an angularly adjusted position.

Figure 2:
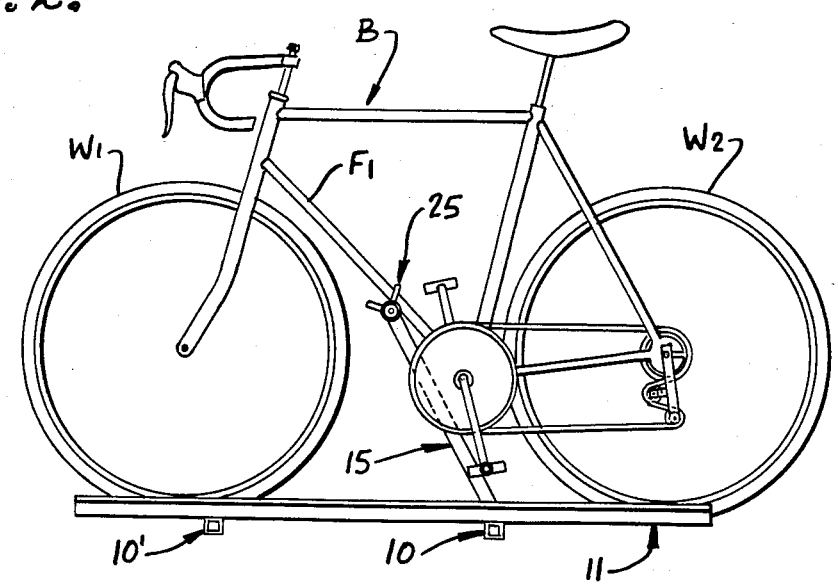
FIG. 2 is a side elevational view of the bicycle support device with the bicycle mounted thereon.

The intermediate portions 15c of the bicycle support members 15, 15' are rigidly interconnected as by a bolt 23, washer 24, lock washer 24a and nut 24b (see FIG. 5), so that the bicycle support members 15 and 15' form a laterally stable assembly which moves as a unit between lower and raised positions. A means are provided on the bicycle support members and hinge brackets for limiting raising of the bicycle support members to a position in which they extend at an acute angle to a horizontal plane through the wheel receiving channels. As best shown in FIGS. 5 and 6, the flattened lower end portions 15a of the bicycle support members are shaped to form a cam nose 15f spaced radially from the pivot axis of the bicycle support members and arranged to engage the base 16a of the associated hinge bracket, when the bicycle support members are moved to a preselected raised position. This provides a firm stop which limits raising movement of the bicycle support members. When the bicycle support members are in their raised position, the upper end portions 15d are advantageously disposed in a plane medially between the ends of the bicycle support channels, as shown in FIGS. 2 and 3.

The laterally extending upper end portions 15d on the bicycle support members 15, 15' are arranged to overlie the respective wheel receiving channels 11, 11', and bicycle frame engaging clamps 25 are provided on the laterally extending upper portions 15d of each of the bicycle support members. The frame engaging clamps 25 are advantageously in the form of J-bolts having a stem portion 25a that extends through openings 15g in the upper end portions 15d and a hook portion 25b arranged to extend at least part way around a frame member on a bicycle to clamp it to the portion 15d of a bicycle support member. The frame engaging clamps are adjusted into clamp position by wing nuts 35 and washers 28, 29 are interposed between the wing nuts and the laterally extending portion 15d. A cap 32 of resilient material such as rubber, plastic or the like is fitted on the end of each of the laterally extending portions 15d to close the end of the tube and to also provide a resilient abutment for the frame of the bicycle. As is conventional, the hook portions 25b on the bolts can be covered with a resilient material such as plastic, rubber or the like. A means such as straps 36 are provided for retaining the wheels of a bicycle in the channels.

From the foregoing, it is thought that the construction and operation of the foldable bicycle support device will be readily understood. The bicycle support members 15, 15' are pivotally mounted by pivot bolts 21 on hinge brackets 16 to the same cross member 10, for pivotal movement relative thereto about a common axis. The bicycle support members converge toward each other and are rigidly interconnected at their converging portions to form a laterally stable assembly which can be moved as a unit between a raised and a lowered position. The cam nose 15f on the lower ends of the support members is arranged to engage the base 16a of the associated hinge bracket to limit raising of the bicycle support members when they reach a preselected position at an acute angle to a horizontal plane through the channel members. In use, a bicycle B is positioned with its front and rear wheels W1 and W2 in one of the wheel receiving channels such as 11 and the frame engaging clamp 25 is tightened to clamp one of the frame members such as F1 shown in FIG. 2, to the laterally extending portion 15d of the associated bicycle support member 15. The cam nose 15f engages the base of the hinge bracket and limits movement of the bicycle in a direction that would cause further raising of the bicycle support member. Movement of the bicycle along the channel in the opposite direction is also limited since downward movement of the bicycle support member is resisted by the clamp 25 on the bicycle support member engaging the frame of the bicycle. The means such as the straps 36 which are provided to retain the front and rear wheels of the bicycle into the respective wheel receiving channel, also aid in limiting movement of the bicycle in a direction lengthwise of the wheel receiving channels. Since the first and second bicycle support members 15, 15' are rigidly interconnected at their converging portions, they form a very rigid assembly which provides a laterally stable support for a bicycle in either one or both channels.

The embodiments of the invention in which an exclusive property or privilege is claimed are defined as follows:

1. A foldable bicycle support device comprising,
   (a) first and second cross frame members,
   (b) first and second wheel receiving channels extending crosswise of said first and second cross frame members in laterally spaced relation to each other,
   (c) first and second hinge brackets each having a base portion and a leg portion extending transverse to the base portion,
   (d) first means attaching the base portion the first hinge bracket and the first wheel receiving channel to said first cross member with the leg portion of the first hinge bracket extending transverse to the first cross member, second means attaching the base portion of the second bracket and the second wheel receiving channel to the first cross member with the leg portion of the second hinge bracket extending transverse to the first cross member, said first and second wheel receiving channels being laterally spaced apart on said first cross member and the leg portions of the first and second hinge brackets being disposed between the first and second wheel receiving channels, (e) first and second tubular bicycle support members each having a flattened lower end portion disposed alongside the leg portion of the respective first and second hinge bracket; a converging portion that extends in converging relation toward an upright medial plane intermediate the first and second wheel receiving channels; an intermediate portion disposed adjacent said upright medial plane, and an upper end portion that extends from the intermediate portion laterally outwardly toward said wheel receiving channels from said upright medial plane, (f) first and second pivot means extending through and pivotally connecting the flattened lower end portions of the first and second bicycle support members to the leg portions of the respective first and second hinge brackets to support the first and second bicycle support members for pivotal movement about a pivot axis paralleling the first cross member member between a lower and a raised position, (g) means rigidly connecting the intermediate portions of the first and second bicycle support members to each other whereby the first and second bicycle support members form a laterally stable assembly, said assembly can be moved as connected between said lower and raised positions, (h) the first and second bicycle support members each having means on their lower end portion engageable with the respective first and second hinge bracket for limiting raising of the bicycle support members when they are disposed at a preselected acute angle to a horizontal plane through the first and second wheel receiving channels, and (i) first and second bicycle frame clamp means on the upper end portion of the respective first and second bicycle support members, for engaging a bicycle frame to support bicycle in a generally upright plane in the respective first and second wheel receiving channels.

2. A foldable bicycle support device according to claim 1 wherein said first and second bicycle support members have a like configuration 3. A foldable bicycle support device according to claim 2 wherein said first and second hinge brackets have a like configuration.

4. A foldable bicycle support device according to claim 1 wherein said means for limiting raising of the bicycle support members comprises a cam nose on the flattened lower end portion on each of the first and second bicycle support members, said cam nose being spaced radially from the pivot axis and arranged to engage the base portion of the associated hinge bracket when the bicycle support members are raised to said preselected acute angle.

5. A foldable bicycle support device according to claim 4 including a washer of synthetic resin material interposed between the flattened lower end portion on each bicycle support member and the leg portion on the associated hinge bracket.

6. A foldable bicycle support device according to claim 1 wherein the upper end portion of the bicycle support members in their raised position are disposed in an upright plane medially between the ends of the respective first and second bicycle support channels.

* * * * *

UNITED STATES PATENT AND TRADEMARK OFFICE
CERTIFICATE OF CORRECTION

PATENT NO. : 4,733,810
DATED : March 29, 1988
INVENTOR(S) : Joseph V. Graber et al It is certified that error appears in the above-identified patent and that said Letters Patent are hereby corrected as shown below:

Claim 1, column 4, line 55, after "portion" insert -- of --;
Claim 1, column 5, line 21, delete the second "member";
Claim 1, column 6, line 6, after "support" insert -- a --.

Signed and Sealed this

Twenty-sixth Day of July, 1988

Attest:

DONALD J. QUIGG

Attesting Officer

Commissioner of Patents and Trademarks